United States Patent [19]
Paul

[11] Patent Number: 5,857,012
[45] Date of Patent: Jan. 5, 1999

[54] RADIO TELEPHONE BASE STATION WITH A MONITORING APPARATUS

[75] Inventor: Clifford Thomas Paul, Fleet Hampshire, United Kingdom

[73] Assignee: Nokia Telecommunications Oy, Espoo, Finland

[21] Appl. No.: 666,421

[22] PCT Filed: Oct. 12, 1995

[86] PCT No.: PCT/GB95/02408

§ 371 Date: Aug. 29, 1996

§ 102(e) Date: Aug. 29, 1996

[87] PCT Pub. No.: WO96/12379

PCT Pub. Date: Apr. 25, 1996

[30] Foreign Application Priority Data

Oct. 15, 1994 [GB] United Kingdom .................. 9420827

[51] Int. Cl.[6] .............................. H04M 1/24; H04M 3/08; H04M 3/22
[52] U.S. Cl. ................................ 379/34; 379/5; 455/67.4; 455/561; 455/67.1; 455/424
[58] Field of Search ................................. 379/1, 5, 9, 10, 379/15, 27, 29, 32, 58, 59, 34; 455/67.1, 33.1, 33.2, 67.4, 73, 88, 115, 423, 424, 425, 561; 370/247, 248, 249, 250

[56] References Cited

U.S. PATENT DOCUMENTS

| 5,448,766 | 9/1995 | Sanning et al. | 455/67.1 |
| 5,557,603 | 9/1996 | Barlett et al. | 370/16 |
| 5,574,981 | 11/1996 | Ahonen | 455/67.4 |
| 5,754,560 | 5/1998 | Nousiainen et al. | 455/67.4 |

FOREIGN PATENT DOCUMENTS

WO 91/15904 10/1991 WIPO.

*Primary Examiner*—Curtis A. Kuntz
*Assistant Examiner*—Binh K. Tieu
*Attorney, Agent, or Firm*—Perman & Green, LLP

[57] ABSTRACT

A base station for a radio telephone system includes a monitoring device for monitoring operation of the base station. The base station has two antennas, and two couplers for coupling the monitoring device respectively to first and second ones of the antennas. Thereby, test calls can be made between the base station and the monitoring device without the need for the monitoring device to have an antenna. Each of the coupling means is operative to enable selective transmission and reception of signals at the monitoring device via a respective one of the first and second antennas.

5 Claims, 1 Drawing Sheet

RADIO TELEPHONE BASE STATION WITH A MONITORING APPARATUS

BACKGROUND OF THE INVENTION

This invention relates to a radio telephone base station which includes, or is associated with, monitoring means for monitoring test calls.

A radio telephone base station for a cellular system communicates by radio with portable handsets carried by subscribers to the system. The base station has a main antenna (providing receive and transmit functions) and a second or so-called diverse antenna providing a receive function only. At or adjacent the base station is located a monitoring means which is like a dummy portable handset in that the monitoring means has an antenna and test calls can be set up between the base station antennas and the monitoring means antenna, in this case to test the correct functioning of the base station.

The need for the monitoring means to have an antenna has disadvantages: apart from the cost of antenna construction and erection there can be difficulties in obtaining planning consent for a further antenna, particularly if it is proposed to add monitoring means to an existing base station. The invention aims to provide a base station with monitoring means which do not require an antenna additional to the antennas of the base station.

SUMMARY OF THE INVENTION

According to the invention there is provided a base station for a radio telephone system, the base station being associated with monitoring means for monitoring the operation of the base station, the base station having two antennas, and the monitoring means being capable of being coupled to a first of the antennas by first coupling means and the monitoring means being capable of being coupled to a second of the antennas by second coupling means, whereby test calls can be made between the base station and the monitoring means without the need for the monitoring means to have an antenna.

The monitoring means is preferably connected to the first coupling means through a first switch which is openable to isolate the monitoring means from the first coupling means. Similarly, the monitoring means is preferably connected to the second coupling means through a second switch which is openable to isolate the monitoring means from the second coupling means.

BRIEF DESCRIPTION OF THE DRAWINGS

A base station and monitoring means according to the invention will now be described, by way of example, with reference to the accompanying drawing which shows the base station and monitoring means In diagrammatic form

DETAILED DESCRIPTION OF THE INVENTION

Figure 1:
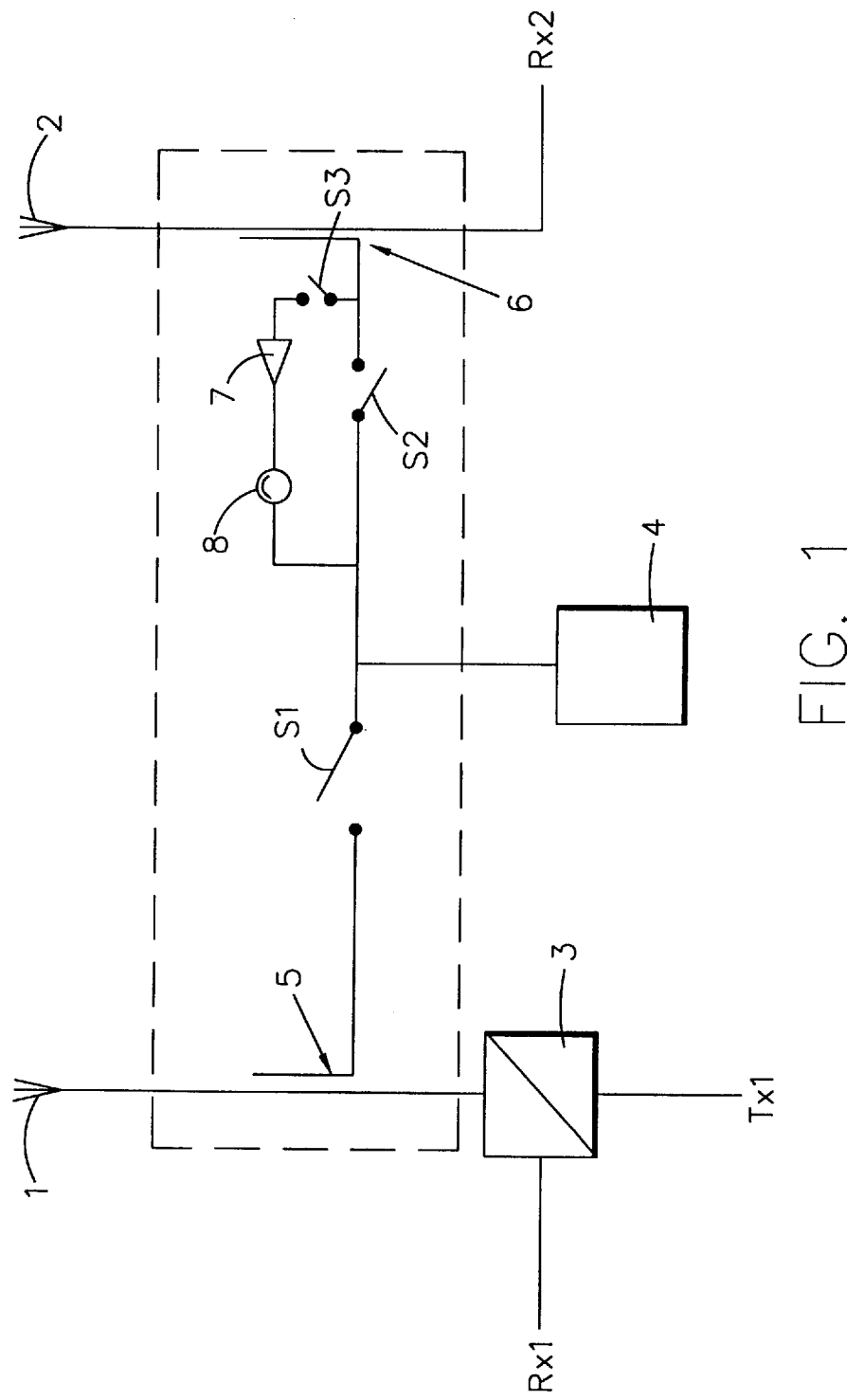

Referring to the drawing, the base station operates in a radio telephone system, eg a cellular system, and communicates with portable handsets carried by subscribers to the system. To do this, the base station has a first (main) antenna 1, which both transmits and receives, and a second (diverse) antenna 2 which receives only and provides antenna diversity, in a known manner. The first antenna 1 is connected to a duplexer 3 which separates receive and transmit signals, indicated respectively as Rx1 and Tx1 in the drawing. The second antenna 2 feeds receive signals Rx2 to the diverse channel of the base station.

The base station is associated with a radio frequency monitor 4 for monitoring test calls initiated by the base station or by the monitor. The monitor 4 can be viewed as a dummy handset which is permanently positioned at or near the base station to check correct operation. Conventionally, such a monitor carries an antenna which communicates through the air with the antennas of the base station when test calls are made. The invention avoids the need for the monitor to be equipped with an antenna.

According to the invention the monitor 4 is coupled to the first antenna 1 by first coupling means 5 and is coupled to the second antenna 2 by second coupling means 6. Both the first and the second coupling means 5, 6 are constituted by high directivity couplers. A first switch S1 is interposed in the electrical connection between the monitor 4 and the first coupling means 5. When the switch S1 is closed, the monitor 4 is connected to the first coupling means 5 and when the switch S1 is open the monitor 4 is disconnected or electrically isolated from the first coupling means 5. Similarly, the monitor 4 is connected to the second coupling means 6 by a second openable switch S2.

A parallel circuit around the second switch S2 includes a third switch S3, an amplifier 7 and a circulator 8. The circulator 8 acts to prevent power from the monitor transmitter causing problems. The parallel circuit is for BCCH (Broadcast Control Channel) monitoring.

The following test calls are possible:

1. Call initiated by monitor 4:
   S1: closed
   S2: open
   S3: open

The calls go from the monitor 4, through S1, the first coupling means 5, the first antenna 1, through the air to the second antenna 2 and thence to the diverse receive channel.

2. Call initiated by base station:
   S1: open
   S2: closed
   S3: open

The call goes from the first antenna 1 to the second antenna 2 and thence to the main receive channel Rx1.

3. Call initiated by monitor 4:
   S1: open
   S2: closed
   S3: open

Call goes from the monitor 4, through S2, the second coupling means 6, the second antenna 2, through the air to the first antenna 1 and thence to the main receive channel Rx1.

4. BCCH monitoring:
   S1: open
   S2: open
   S3: closed

Call goes via the second antenna 2 through S3, the amplifier 7, the circular 8 and thence to the monitor 4.

In the drawing, the components S1, S2, S3, 5, 6, 7 and 8 are shown enclosed in a broken line box, indicating that these components can be implemented as a single subassembly linking the monitor 4 and the antennas 1 and 2.

The test calls, and the operation of the switches S1, S2 and S3 and other components, are set up from a remote control station from which the correct operation of the base station can be monitored or checked with the aid of the monitor 4.

What is claimed is:

1. A base station for a radio telephone system, the base station being associated with monitoring means for monitoring the operation of the base station, the base station having two antennas, and the monitoring means being capable of being coupled to a first of the antennas by first coupling means and the monitoring means being capable of being coupled to a second of the antennas by second coupling means, said first coupling means providing for a coupling of a signal transmitted by said monitoring means to said first antenna, and said second coupling means providing for a coupling of a signal transmitted by said monitoring means to said second antenna and a coupling of a signal received by said second antenna to said monitoring means, whereby test calls can be made between the base station and the monitoring means without the need for the monitoring means to have an antenna, wherein each of the first and the second coupling means is operative to enable selective transmission and reception of signals at the monitoring means via a respective one of the first and the second antennas.

2. A base station according to claim 1, wherein the first and second coupling means are constituted by high directivity couplers relying on inductive coupling.

3. A base station according to claim 1, wherein the monitoring means is connected to the first coupling means through a first switch which is openable to isolate the monitoring means from the first coupling means, and the monitoring means is connected to the second coupling means through a second switch which is openable to isolate the monitoring means from the second coupling means.

4. A base station according to claim 1, wherein the first of the base station antennas is a transmit/receive antenna and the second of the base station antennas is a receive only antenna.

5. A base station according to claim 3, wherein a parallel circuit around the second switch comprises a third switch, an amplifier and a circulator, said parallel circuit enabling BCCH (Broadcast Control Channel) monitoring to be effected.

* * * * *